(12) United States Patent
Crawford et al.

(10) Patent No.: US 6,903,891 B1
(45) Date of Patent: Jun. 7, 2005

(54) PHOTOCONDUCTIVE OPTICAL WRITE DRIVER FOR MAGNETIC RECORDING

(75) Inventors: Thomas McLendon Crawford, Pittsburgh, PA (US); Mark William Covington, Pittsburgh, PA (US); Thomas William Clinton, Pittsburgh, PA (US)

(73) Assignee: Seagate Technology LLC, Scotts Valley, CA (US)

(*) Notice: Subject to any disclaimer, the term of this patent is extended or adjusted under 35 U.S.C. 154(b) by 16 days.

(21) Appl. No.: 10/720,872

(22) Filed: Nov. 24, 2003

(51) Int. Cl.$^7$ ................................................ G11B 5/09
(52) U.S. Cl. .............................. 360/46; 360/68; 360/61; 360/55
(58) Field of Search .............................. 360/68, 61, 62, 360/63, 55, 46, 67; 327/108, 110

(56) References Cited

U.S. PATENT DOCUMENTS

| | | | |
|---|---|---|---|
| 4,446,425 A | 5/1984 | Valdmanis et al. | |
| 4,482,863 A | 11/1984 | Auston et al. | |
| 6,081,499 A | 6/2000 | Berger et al. | |
| 6,134,207 A | 10/2000 | Jerman et al. | |
| 6,317,280 B1 * | 11/2001 | Nakajima et al. | 360/59 |
| 6,463,190 B1 | 10/2002 | Kato et al. | |
| 6,687,205 B1 * | 2/2004 | Huber | 369/47.19 |
| 2003/0053258 A1 | 3/2003 | Dunn et al. | |

OTHER PUBLICATIONS

D. H. Auston, "Picosecond Optoelectronic Switching and Gating in Silicon," *Applied Physics Letters*, vol. 26, No. 3, Feb. 1, 1975, pp. 101–103.
J. A. Valdmanis et al., "Picosecond Electro–Optic Sampling System," *Applied Physics Letters*, vol. 41, No. 3, Aug. 1, 1982, pp. 211–212.
G. Burns, *Solid State Physics*, Academic Press, San Diego, 1985, pp. 288–289.

F. E. Doany et al., "Carrier Lifetime Versus Ion–Implantation Dose in Silicon on Sapphire," *Applied Physics Letters*, vol. 50, No. 8, Feb. 23, 1987, pp. 460–462.
M. E. Dunham et al., "Saturation Behavior of Silicon Auston Switches," *Journal of Applied Physics*, vol. 66, No. 1, Jul. 1, 1989, pp. 413–418.
D. R. Dykaar et al., "Ultrafast Coplanar Air–Transmission Lines," *Applied Physics Letters*, vol. 57, No. 11, Sep. 10, 1990, pp. 1123–1125.
Y. Chen et al., "375–GHz–Bandwidth Photoconductive Detector," *Applied Physics Letters*, vol. 59, No. 16, Oct. 14, 1991, pp. 1984–1986.
U. D. Keil et al., "Generation of Ultrashort Electrical Pulses With Variable Pulse Widths," *Applied Physics Letters*, vol. 66, No. 13, Mar. 27, 1995, pp. 1629–1631.
R. G. Decorby et al., "Large (50 $\mu$m)$^2$ Metal–Semiconductor–Metal Photodetectors With 18 GHz Bandwidth at 3 V Bias; Reduction of Hole Pileup," *Applied Physics Letters*, vol. 73, No. 2, Jul. 13, 1998, pp. 196–198.
M. Stellmacher et al., "Photoconductivity Investigation of the Electron Dynamics in GaAs Grown at Low Temperature," *Applied Physics Letters*, vol. 74, No. 9, Mar. 1, 1999, pp. 1239–1241.

* cited by examiner

*Primary Examiner*—Alan T. Faber
(74) *Attorney, Agent, or Firm*—Robert P. Lenart, Esq.; Pietragallo Bosick & Gordon

(57) ABSTRACT

A write driver for use with a magnetic recording head includes a photoconductive switch that is positioned adjacent a magnetic recording head for switching current waveforms. Both light and a DC voltage are applied to the photoconductive switch to switch the applied current waveforms. The write driver further includes means for writing to a storage medium in response to current waveforms switched by the photoconductive switch. The write driver may also include a suspension that supports at least one photoconductive switch, DC conductors for supplying a DC voltage, means for supplying light, and recording head means for writing to a storage medium.

35 Claims, 7 Drawing Sheets

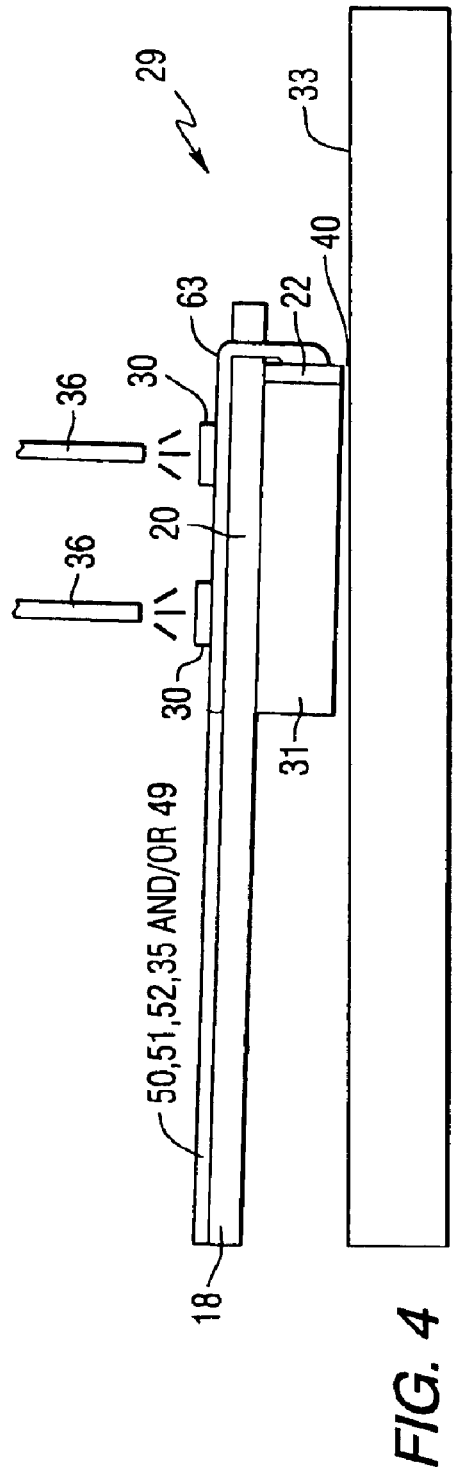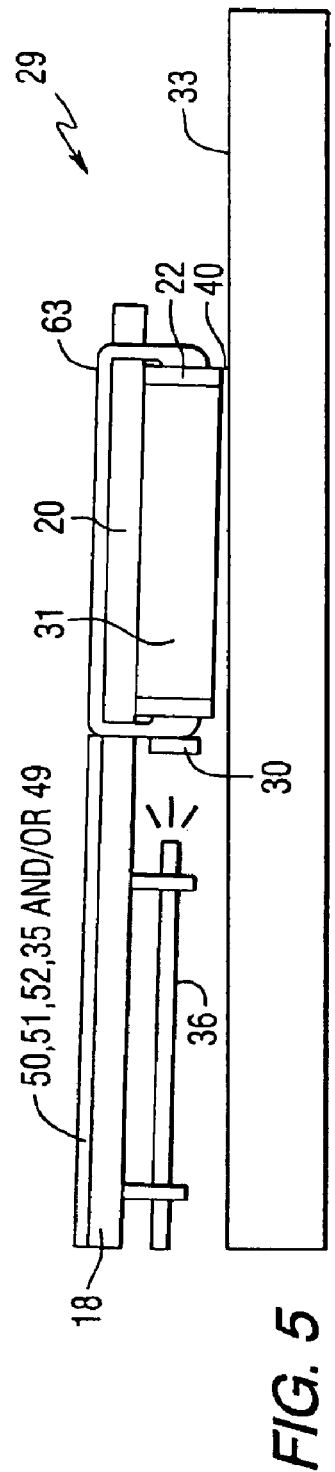

PHOTOCONDUCTIVE OPTICAL WRITE DRIVER FOR MAGNETIC RECORDING

FIELD OF THE INVENTION

The invention relates to recording heads for use with magnetic storage media, and more particularly, to magnetic recording head assemblies that utilize photoconductive switches located adjacent the recording head.

BACKGROUND INFORMATION

One of the problems associated with advancing magnetic recording technology is the interconnect between the write electronics and the writer and/or reader located on the slider. Conventional interconnects are typically 1–2 inches long and are often fabricated from polyimide materials containing imbedded circuit traces. The interconnect typically carries the write current pattern and readback signal and is physically attached to the suspension, which can act like an isolated ground plane for part of the interconnect length, or can be electrically connected to the suspension, and is therefore part of the actual circuit path. Interconnect designs, which are shorter and have ground planes, have been advanced as possible solutions for increasing interconnect bandwidth to stage higher data rate magnetic recording. However, the bandwidth capabilities of existing silicon-based write drivers are likely to limit the data rate transmission to a few Gbits/sec. Furthermore, the mechanical constraints associated with conventional interconnects, such as flex-on-suspension (FOS), are likely to contribute to the limitations of conventional data rate transmission. Typical FOS leads are capable of delivering electrical waveforms to the writer at the limited recording frequencies of from about 0.1 to 3.0 GHz. However, there are no proven methods capable of extending recording bandwidths to the frequency range of from about 5 GHz to about 10 GHz. Furthermore, there are no proven methods capable of extending recording bandwidths to THz frequencies.

A possible solution advanced for increasing interconnect bandwidth to stage higher data rate magnetic recording includes moving the write driver out onto the suspension system to physically move the driver output currents closer to the recording head thereby reducing the impact of the bandwidth of the FOS. However, moving the write driver onto the suspension poses significant challenges, for example, putting a silicon interconnect package out onto a suspension requires substantial heat sinking to dissipate the heat generated by the high current preamp chip. As a result, present efforts to extend recording data rates have focused on evolving the FOS bandwidth via a distributed transmission line model, where the preamp is adjusted to match measured and/or modeled FOS behavior. Conventional FOS interconnects have risetimes on the order of 500 ps to 1 ns. By using RLC networks of resistors, capacitors and inductors along with reduced FOS lengths, risetimes on the order of 100 ps are possible. However, risetimes on the order of 100 ps are insufficient to achieve write current bandwidths required for recording frequencies greater than 3 GHz (6 Gbit/sec).

As disclosed in *Generation of ultrashort electrical pulses with variable pulse widths*, Keil, U. D., et al., Appl. Phys. Lett., 1995 66(13) p. 1629, semiconductor substrates subjected to femtosecond solid state laser pulses can generate THz radiation with risetimes on the order of 400 fs. As disclosed in *375-GHz-bandwidth photoconductive detector*, Chen, Y., et al., Appl. Phys. Lett., 1991 59(16) p. 1984, photoconductive substrates have been used to generate voltage pulses as large as 6V from a 30 Ohm switch having a full-width-half-maximum pulse width of 1.5 ps. The magnetic recording industry could greatly benefit from incorporating photoconductive current sources capable of producing such signals adjacent a recording head in a magnetic recording head assembly in order to extend data rates beyond 6 Gbit/sec.

Accordingly, there is identified a need for an improved recording head for higher recording densities and increased data rate transmission that overcomes limitations, disadvantages or shortcomings of known recording heads.

SUMMARY OF THE INVENTION

The invention meets the identified need, as well as other needs, as will be more fully understood following a review of this specification and drawings.

In accordance with an aspect of this invention, a write driver for magnetic recording includes at least one photoconductive switch positioned adjacent a magnetic recording head for generating current waveforms, DC conductors for supplying a DC voltage to the photoconductive switch, means for supplying light to the photoconductive switch, and recording head means for writing to a storage medium in response to current waveforms generated by the photoconductive switch.

In accordance with another aspect of this invention, a recording head for use with magnetic storage media includes a write driver comprising, at least one photoconductive switch positioned adjacent a magnetic recording head for generating current waveforms, DC conductors for supplying a DC voltage to the photoconductive switch, means for supplying light to the photoconductive switch, and means for writing to a storage medium in response to current waveforms generated by the photoconductive switch.

In accordance with yet another aspect of this invention, a magnetic disc drive storage system includes a housing, a rotatable magnetic storage medium positioned in the housing having a plurality of magnetic tracks, each track having a plurality of magnetic domains, and a movable recording head mounted in the housing adjacent the magnetic storage medium. The disc drive includes a write driver for magnetic recording, the write driver comprises at least one photoconductive switch positioned adjacent a magnetic recording head for generating current waveforms, DC conductors for supplying a DC voltage to the photoconductive switch, means for supplying light to the photoconductive switch, and recording head means for writing to a storage medium in response to current waveforms generated by the photoconductive switch.

BRIEF DESCRIPTION OF THE DRAWINGS

FIG. 4 is a pictorial representation of a photoconductive optical write driver of the present invention.

FIG. 5 is a pictorial representation of a photoconductive optical write driver having an alternative location of the photoconductive switch of the present invention.

DETAILED DESCRIPTION

Figure 1:
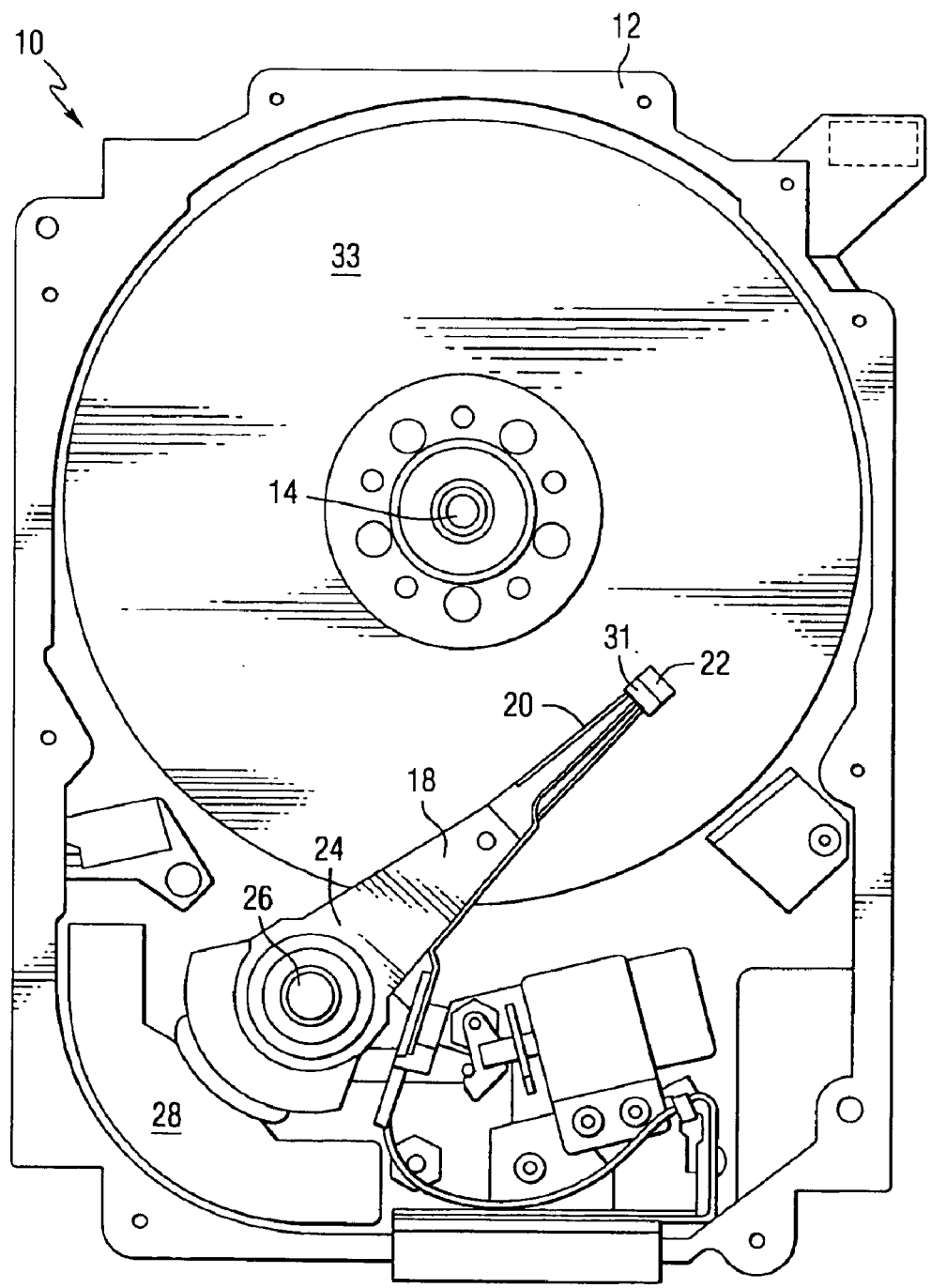
FIG. 1 is a pictorial representation of a disc drive that can use a recording head with a photoconductive optical write driver constructed in accordance with this invention.

FIG. 1 is a pictorial representation of a disc drive 10, which may employ a recording head having a photoconductive optical write driver for magnetic recording constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 33, such as a magnetic disc, which may be constructed for either longitudinal or perpendicular magnetic recording, within the housing 12. At least one suspension 18 is contained within the housing 12, with each suspension 18 having a first end 20 having a slider 31 and a recording head 22 mounted thereon, and a second end 24 pivotally mounted on a shaft by a bearing 26. An actuator motor 28 is located at the suspension's second end 24 for pivoting the suspension 18 to position the recording head 22 over a desired sector of the magnetic storage media 33. In one example of the present invention, each sector of magnetic storage media 33 includes a plurality of magnetic tracks, each track having a plurality of magnetic domains. The actuator motor 28 is regulated by a controller, which is not shown in this view and is well known in the art.

FIGS. 2–5 are pictorial representations of the optical write driver 29 of the present invention showing photoconductive switches 30 (30a and 30b), slider 31, suspension assembly 18 and structures for providing light to illuminate the photoconductive switches 30 (30a and 30b), such as optical fibers 36 or mirrors. The photoconductive optical write driver 29 of the present invention comprises at least one photoconductive switch 30 located adjacent recording head 22 to generate current waveforms for transmission to at least one recording head 22 in magnetic communication with magnetic storage medium 33. Photoconductive switch 30 converts an applied optical waveform into an electrical current waveform by rapidly switching the electrical resistance from high to low, thereby generating a switched current.

Figure 2:
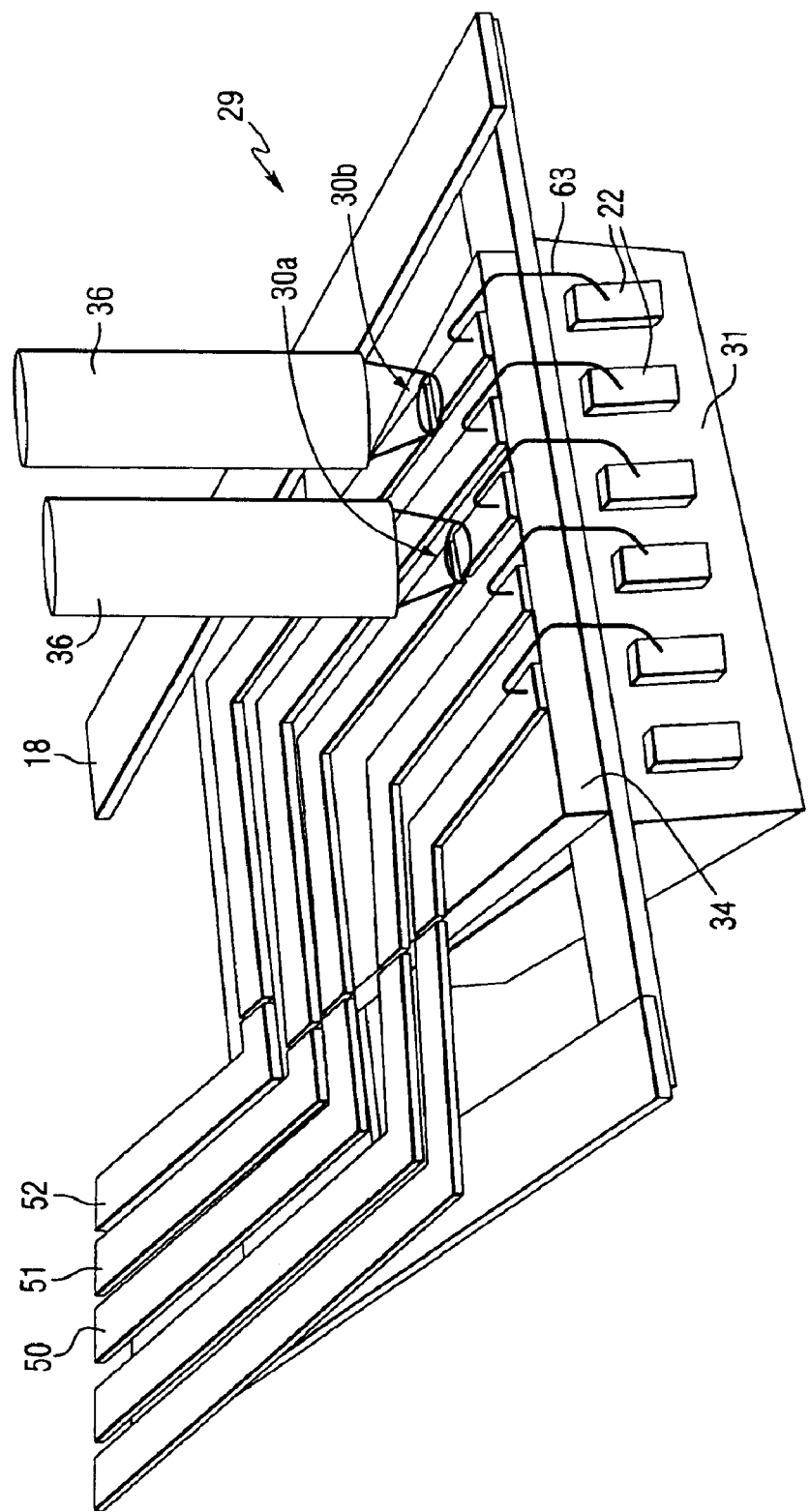
FIG. 2 is a pictorial representation of a photoconductive optical write driver of the present invention.

The photoconductive switch 30, also known as an Auston switch, is typically employed to perform electro- or magneto-optic sampling of the ultrafast response of a device or delivery system. In one example of the present invention, the photoconductive switch 30 includes a semiconductor substrate 34. Examples of suitable semiconductor substrates include silicon, silicon-on-sapphire (SOS), low-temperature-grown GaAs (LT-GaAs), semi-insulating GaAs, SiGe, and $SiO_2/Si_3N_4$. In one example of the present invention, DC conductors for supplying a DC voltage are provided in electrical communication with the semiconductor substrate 34 to bias the semiconductor substrate material 34. As shown in FIG. 2, the DC conductors for supplying a DC voltage to the semiconductor substrate 34 can include a positive electrode 50, a negative electrode 52 and a ground 51 each in electrical communication with the semiconductor substrate 34. Electrodes 50 and 52 can comprise Cu, Au, Al and or any other conductive material. Voltages of from about 1 V to about 1,000 V can be supplied to the semiconductor substrate. In another example, voltages of from about 2 V to about 15 V can be supplied to the semiconductor substrate. This voltage range can be determined by economic and mechanical feasibility constraints of a given DC voltage source, including any required write preamps, transistors, amplifiers, operational amplifiers and the like.

Figure 6:
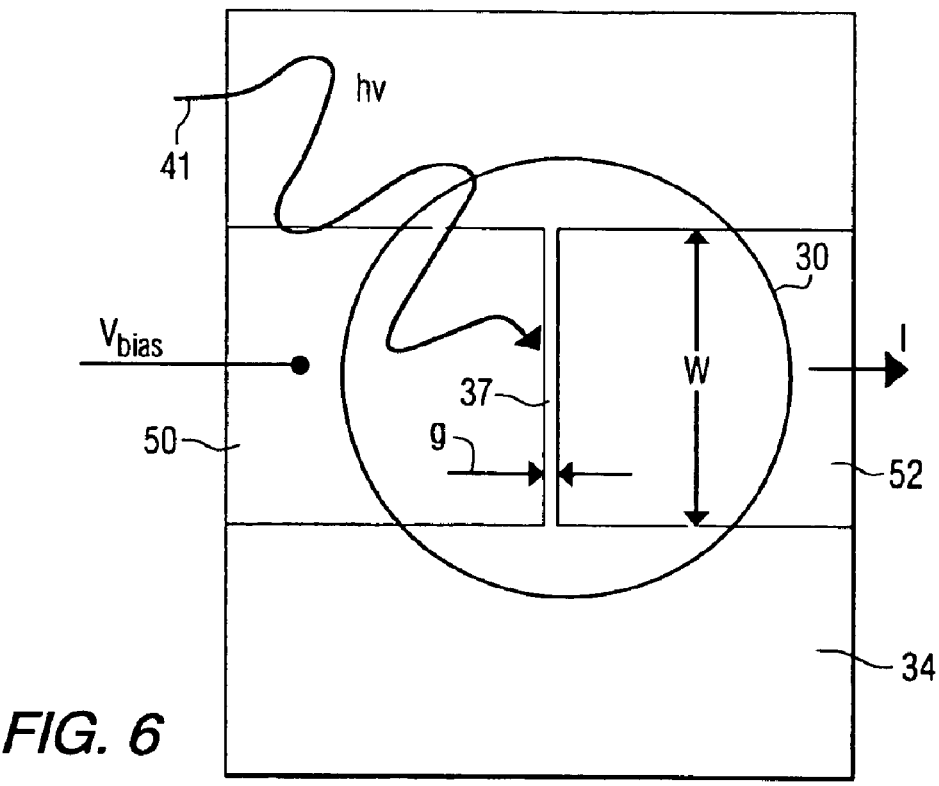
FIG. 6 is a pictorial representation of a photoconductive switch of the present invention.
Figure 7:
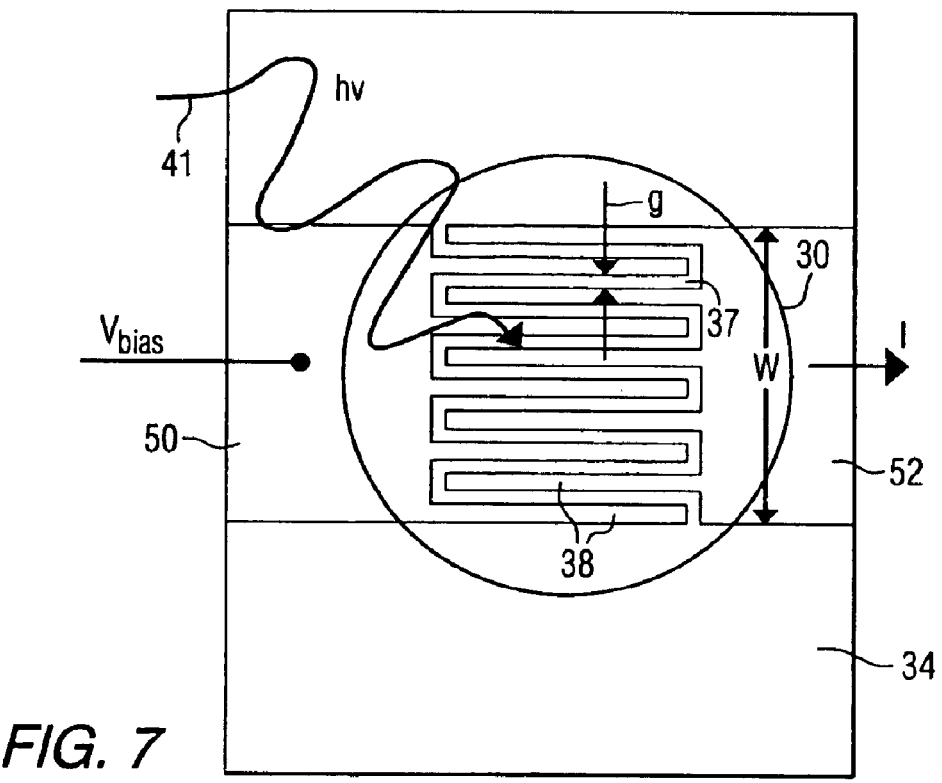
FIG. 7 is a pictorial representation of a photoconductive switch of the present invention.

FIGS. 6 and 7 illustrate the physical geometry of a photoconductive switch 30 made from low temperature grown GaAs (LT-GaAs) having a thickness of about 1 μm and having 20 mW applied laser power. As illustrated in FIGS. 6 and 7, photoconductive switch 30 can comprise a gap 37 between at least two DC conductors for supplying a DC voltage. In one example, the length of the gap is from about 50 nm to about 10 μm. In another example, the length of the gap is about 100 nm. In another example the distance of the gap remains about constant throughout the generally parallel arrangement of the positive and negative electrodes. The width of the DC conductors for supplying a DC voltage can be about 100 μm. As shown in FIG. 7, photoconductive switch 30 can be arranged such that the electrodes are structured in an interleaved fashion to increase the length of the border between the positive 50 and negative electrodes 52, while maintaining the gap distance 37 between the electrodes. In one example, the electrodes have interleaved extensions 38 with a semiconductor material positioned therebetween. This switch geometry is typically referred to as a metal-semiconductor-metal configuration.

As shown in FIGS. 2–5, photoconductive switch 30 can be positioned adjacent a recording head 22 structured and arranged for magnetic recording and in electrical communication with recording head 22. An advantage of positioning photoconductive switch 30 adjacent recording head 22 is that the resulting current risetime is dramatically reduced, and correspondingly, interconnect bandwidth is greatly increased as compared to conventional technologies. Another advantage of positioning photoconductive switch 30 adjacent recording head 22 is that such arrangement would likely require substantially less heat sinking than positioning a preamp chip adjacent recording head 22. Yet another advantage of using photoconductive switch 30 to power recording head 22 is the ability to easily customize the write current waveform for ultrafast pulsed field recording.

In one example, photoconductive switch 30 is electrically connected to recording head 22 by an interconnect 63 that carries current from the photoconductive switch 30 to recording head 22 when optical waveforms 41 carried by structures for providing light such as optical fibers 36 contact the switch 30. In another example, the interconnect can be a flex-on-suspension (FOS) or twisted wires that carry electrical current from photoconductive switch 30 to recording head 22. Recording head 22 can be structured and arranged for perpendicular recording to magnetic storage medium 33. Recording head 22 can also be structured and arranged for longitudinal recording to magnetic storage medium 33. In yet another example, recording head 22 can include a read device.

Photoconductive switch 30 can also be positioned adjacent slider 31. Photoconductive switch 30 can be positioned above or behind slider 31 as shown in FIGS. 4 and 5 respectively. Examples of suitable slider materials include AlTiC, Si, SiC, or a combination of AlTiC with Si, SOS, or GaAs (LT GaAs). Photoconductive switch 30 can be bonded directly to slider 31. In one example, slider 31 can be positioned adjacent the air bearing surface 40 of magnetic storage medium 33, such that recording head 22 is in magnetic communication with magnetic storage medium 33.

In one example of the present invention, as shown in FIGS. 1–4, recording head 22, photoconductive switch 30 and slider 31 are each supported by suspension 18 at a first end 20 of the suspension such that photoconductive switch 30 and slider 31 are each positioned adjacent recording head 22. Suspension 18 is pivotally mounted at a second end 24 of the suspension on a shaft by bearing 26 and movably positions slider 31 and recording head 22 adjacent the air bearing surface 40 of magnetic storage medium 33 such that recording head 22 is in magnetic communication with magnetic storage medium 33. As shown in FIGS. 2–5, suspension 18 can also support DC conductors 50, 51, 52, 35 and/or 49.

Figure 3:
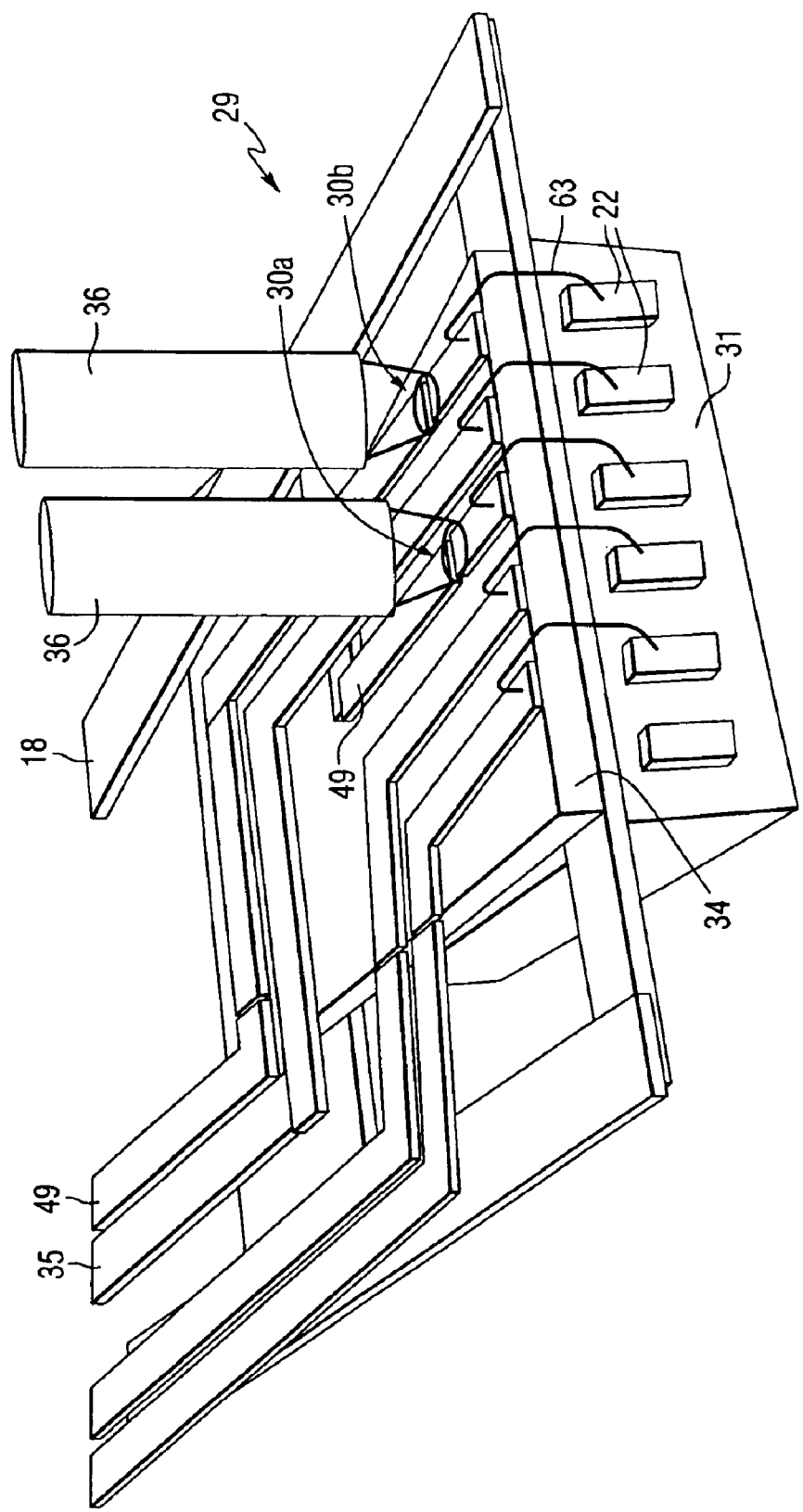
FIG. 3 is a pictorial representation of a photoconductive optical write driver having a center-tap configuration of the present invention.

In one example of the present invention, as shown in FIG. 5, recording head 22 is positioned on suspension 18 adjacent slider 31 and photoconductive switch 30 with fiber optic cable 36 also supported by suspension 18. In another example, as shown in FIGS. 2–4, recording head 22 and slider 31 are positioned on suspension 18 such that photoconductive switch 30 is positioned adjacent slider 31. In yet another example, fiber optic cables 36 can be supported by any part of suspension 18 or housing 12 provided they are optically coupled to photoconductive switch 30.

In each configuration of the present invention, photoconductive switch 30 is positioned to allow light generated from a light source to contact the switch 30. An optical waveform 41 is generated from a light source and focused on the region of the semiconductor substrate 34 where the DC voltage is applied, thereby creating photo-excited carriers, such as electrons and holes. The electrons are swept toward the positively biased electrode 50 and the holes are swept toward the negatively biased electrode 52. When the photo-excited carrier density becomes high enough, the resistance of photoconductive switch 30 is reduced such that the semiconductor substrate 34 effectively shorts the electrodes together, causing current to flow through the switch 30.

Examples of suitable light sources for producing optical waveforms 41 can include diode lasers, solid state lasers, CW lasers and vertical cavity surface emitting lasers (VCSEL). The optical waveforms 41 focused on the region of the semiconductor substrate 34 where DC voltage is applied typically have a wavelength of from about 400 nm to about 1.5 $\mu$m. In one example, the optical waveforms 41 are transmitted from the light source to photoconductive switch 30 by optical fibers 36. In this example the diameter and cladding of the optical fibers 36 are selected to optimize throughput and bandwidth of the optical waveform. In another example, optical waveforms 41 are transmitted from the light source to photoconductive switch 30 by a mirror system. In one example, the mirror system can include mirrors and/or lenses that can be attached to suspension 18 to reflectively guide the optical waveforms 41 from the light source to the photoconductive switch 30.

When optical waveforms 41 from a light source contact photoconductive switch 30 having a silicon semiconductor substrate 34, risetimes ranging from about 1 ps to about 50 ps are possible. In another example of the present invention, photoconductive switches 30 having a silicon semiconductor substrate 34 have a risetime of about 30 ps when contacted by optical waveforms 41 from a light source. The risetime of the photoconductive switch is dependent on the material properties of the semiconductor substrate 34 which determine how efficiently a given material can generate electrons and holes in response to an optical stimulus. Semiconductor substrates 34 made from semi-insulating GaAs typically achieve a faster risetime than those made from silicon, and LT GaAs typically achieves an even faster risetime time than semi-insulating GaAs due to ion-implanted defects. In one embodiment, materials such as Silicon-on-Sapphire (SOS), low temperature-grown GaAs (LT-GaAs), semi-insulating GaAs, and $SiO_2/Si_3N_4$ can be employed to produce photoconductive switches with sufficient risetimes.

The current output from photoconductive switch 30 having an applied DC voltage and applied optical waveforms 41 from a light source is transmitted to recording head 22 by interconnect 63. The resulting output current waveform is capable of having an extended bandwidth and a rapid risetime. Since the applied optical waveforms 41 have an intrinsic bandwidth of many THz, the generated write current bandwidth of the present invention will be significantly greater than the bandwidth carried the length of the suspension 18 by conventional interconnects. In the present invention the length of interconnect 63 is sufficiently short to enable transmission of the write current from the photoconductive switch 30 to the recording head 22 with much higher bandwidth than a conventional interconnect. In one example, the interconnect 63 of the present invention can be from about 0.1 to about 2 mm in length. The bandwidth of the present invention is limited by the properties of the photoconductive switch 30, rather than the bandwidth transmission limitations of long distances of conventional interconnects. In one embodiment, the properties of photoconductive switch 30 can generate frequencies of from about 5 GHz to about 1 THz.

Figure 8A:
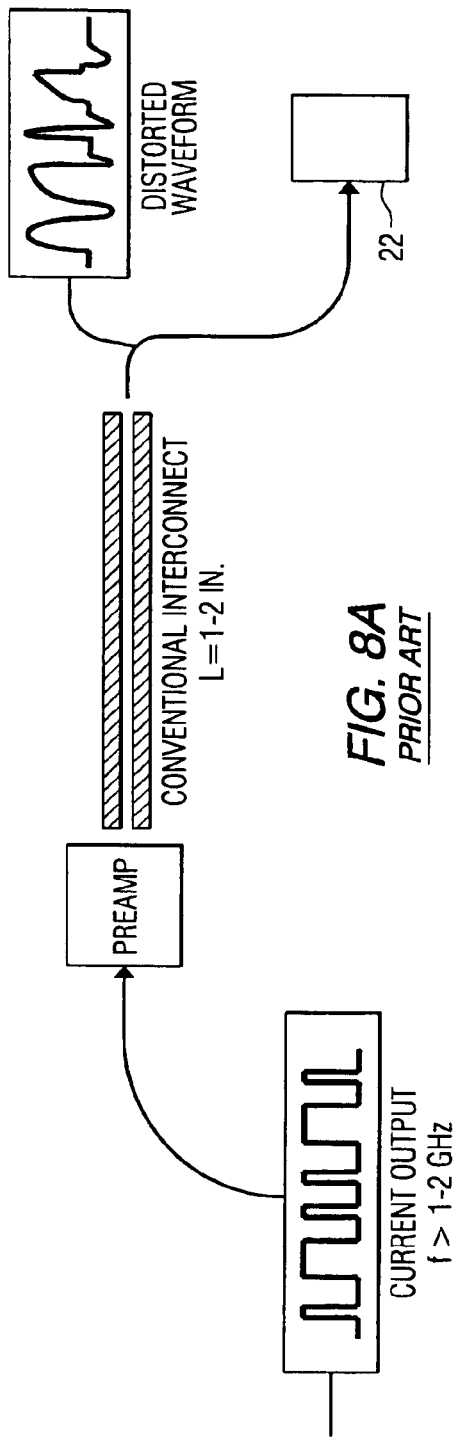
FIG. 8A is a pictorial representation of a prior art system for transmitting current waveforms.
Figure 8B:
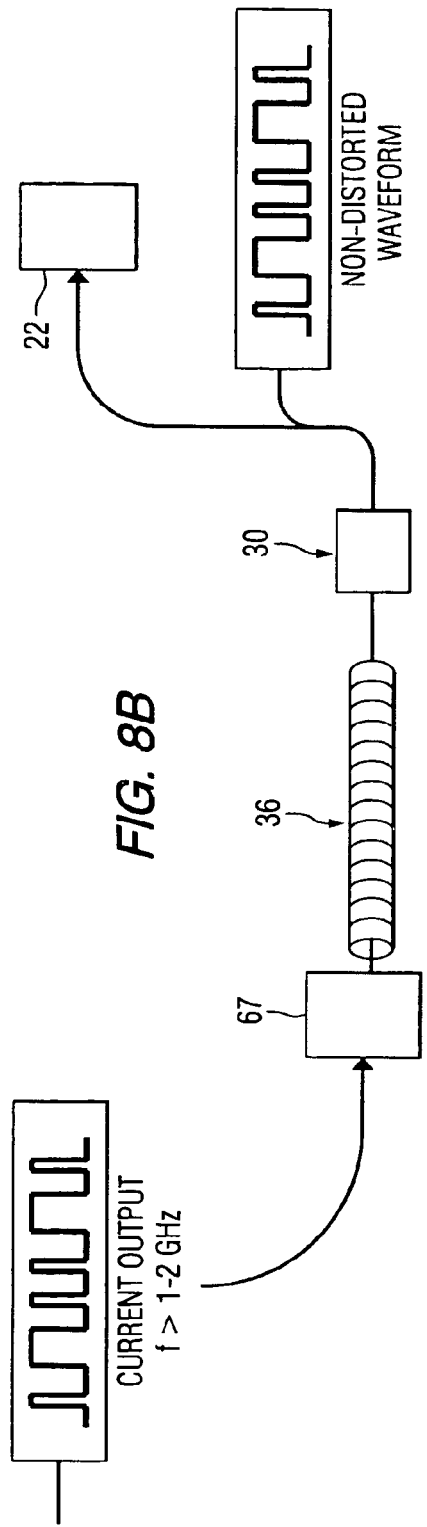
FIG. 8B is a pictorial representation of the present invention system for transmitting current waveforms.

An example prior art system for transmitting current waveforms having conventional interconnects having a length of about 1 to 2 inches is shown in FIG. 8A. When a current output having a frequency of greater than about 2 to about 3 GHz is transmitted along a conventional interconnect, the waveform that is communicated to the recording head becomes distorted. As a result of the lower bandwidth and decreased data rate transmission capability, the system has poor writing performance. As shown in FIG. 8A, in conventional systems of transmitting current output, a preamp generates the desired waveform as an output current and transmits the current waveform to a conventional interconnect, such as a FOS, having a length of about 1 to 2 inches. The waveform that results from transmission through the FOS having a length of about 1 to 2 inches is considerably distorted when compared to the original current output. In contrast, the system for transmitting current waveforms of the present invention is shown in FIG. 8B. When a current output having a frequency of greater than about 1 to 2 GHz is transmitted to a laser driver and optically communicated to photoconductive switch 30 by fiber optic cable 36, the resulting current waveform is non-distorted. Although the current waveform must travel through a short distance of interconnect 63, typically from about 0.1 to about 2 mm, to reach recording head 22, the short distance of the interconnect 63 does not appreciably affect the waveform as compared to conventional interconnect lengths of about 1 to 2 inches.

Figure 9:
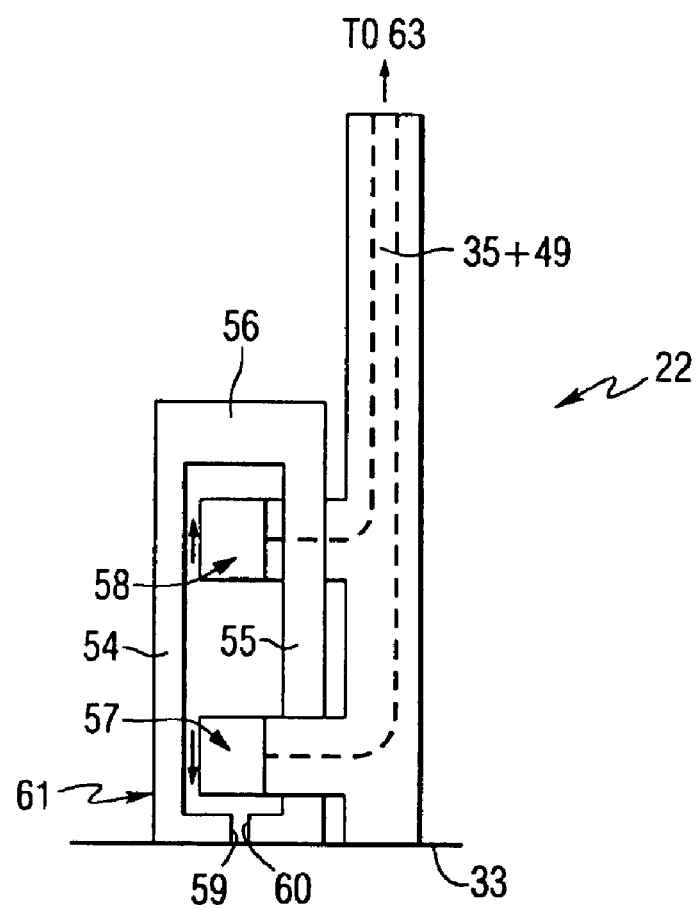
FIG. 9 is a pictorial cross section of a recording head that can be used in conjunction with a photoconductive optical write driver constructed in accordance with this invention.

As shown in FIG. 9, recording head 22 can include a write portion, generally designated by reference number 61, specifically comprising a pair of opposing write poles 54 and 55 connected by a yoke 56. Two oppositely wound recording head conductors 57 and 58 having opposite polarities are wound therearound. As shown in FIG. 9, the pair of write poles 54 and 55 includes respective pole tips 59 and 60, which define a write gap therebetween. When current is passed through either recording head conductor 57 or 58, magnetic flux is induced which produces a magnetic field across the write gap between pole tips 59 and 60. If a first photoconductive switch 30, such as 30a shown in FIGS. 2–3, is shorted such that current is supplied to recording head conductor 57, current passes through yoke 56 in a first direction. If a second photoconductive switch 30, such as 30b as shown in FIGS. 2–3, is shorted such that current is supplied to recording head conductor 58, current passes through yoke 56 in a second direction that is opposite from the first direction. When current passes through yoke 56 it passes through in opposite directions, depending on which photoconductive switch 30 (30a or 30b) is shorted.

In one embodiment, as shown in FIG. 2, one photoconductive switch 30a or 30b can be shorted by allowing optical waveforms to be applied to only 1 switch. In another embodiment, a single tapped writer as shown in FIG. 3 can be used to apply only a single voltage polarity to the semiconductor substrate 34. In this embodiment, operation occurs as described above except that only a single voltage polarity is applied to the photoconductive switches 30a and 30b, thereby requiring only a single positive (or negative) electrode 35, and a ground 49. By switching the optical waveforms 41 between at least two photoconductive switches 30 (30a and 30b), a positive field or a negative field is created in the yoke 56 using only one polarity of voltage. As shown in FIG. 9, an advantage of this configuration is that only one electrode 35 and one ground 49 need to be connected to photoconductive switch 30 and recording head 22.

In another example of the present invention, a charged transmission line, such as a coaxial cable, can be discharged through the recording head 22 using photoconductive switch 30. A length of transmission line can be inserted between DC conductors 50, 51 and 52 and photoconductive switch 30. With the switch 30 open, an applied voltage charges the transmission line to the applied voltage. When photoconductive switch 30 is activated and the switch closes, the charge in the line is discharged through switch 30 to recording head 22. The charged line can be discharged through switch 30 to recording head conductors 57 and 58. The duration of this current depends on the length of the transmission line. An LC circuit network, or an additional photoconductive switch 30, can be used to couple the applied voltage to the transmission line. Using a charged line avoids having to encode the write waveform into the optical waveform since the signal duration comes solely from the length of the transmission line. In this example, photoconductive switch 30 may be optimized for maximum current generation or peak laser energy by relying on the charged line to generate voltage which is constant for a specific length of time.

In another example of the present invention, photoconductive switch 30 can be used as a preamp for pulsed field writing. In applications where a square wave is not desired, this example provides for a single short pulse to be sent to the recording head 22 of a given polarity. The risetime of the pulse is again determined by the semiconductor substrate material 34, but in this example, the optical waveform 41 is short enough that the free carrier decay of photoconductive switch 30 determines the fall time and the ultimate pulse duration. Semiconductor substrate material 34 comprising LT GaAs can be used to generate electrical pulses on the order of 1 ps.

EXAMPLE 1

In an example of the present invention, as shown in FIG. 2, the semiconductor switch is fabricated on LT-GaAs having properties to reduce the switch resistance from infinity to about 50 Ω when the switch is illuminated with reasonable average power from a diode laser. An example of the carrier mobility, or electron mobility, of a representative LT-GaAs composition is $\mu_n = 4000\ cm^2 V^{-1} s^{-1}$.

For an average laser power of 20 mW, i.e. a high photogeneration rate, the resultant carrier density is $n = 3 \times 10^{14}\ cm^{-3}$.

The electrical conductivity is $\sigma = n e \mu_n$ $\sigma = 0.19\ \Omega^{-1}\ cm^{-1}$ where e is the electron charge. Inverting this equation to obtain resistivity, $\rho = 5.2\ \Omega cm$.

For a switch geometry, as shown in FIGS. 6–7, with a 1 μm thick LT-GaAs film and 100 μm long electrodes, with 100 nm between the electrodes, this yields an on-state switch resistance of R=52 Ω. Assuming that the current through the switch saturates at $V_{bias}=5V$, the current output from one of the switches in FIG. 2 is, $$I_{sw} = \frac{V_{sat}}{R_{on\text{-}state}} = \frac{5\ V}{50\ \Omega} = 100\ mA.$$

For the LT-GaAs composition used in this example, the carrier lifetime was estimated to be 80 ps. Therefore, the optical waveforms must be properly modulated to obtain a write current waveform with the desired properties. An 80 ps carrier lifetime is a factor of 3 shorter than conventional write preamp designs for magnetic recording products.

EXAMPLE 2

In another example, carrier lifetimes with other LT-GaAs compositions as short as 100 fs are obtainable, however, they require increased laser power to obtain a similar switch resistance due to their lower carrier mobility and concentration values. For materials wherein μ=2000 and the carrier lifetime=100 fs, from the Example 1 calculation, R=31 kOhms for a 40 mW average power linear photogeneration rate, for materials having a 400 μm border length and 200 μm thickness. For $\mu = 3200\ cm^2\ V^{-1} s^{-1}$, the lifetime=50 ps. From the Example 1 calculation, R=78 kOhms. By increasing the wire thickness and the border length of the electrodes to 2 μm and 400 μm respectively, R=100 Ohms. If the laser power is doubled to 80 mW average power having a linear increase in the photogeneration rate, R=50 Ohms.

EXAMPLE 3

In another example, a modulator driver with 10 ps risetimes and 40 Gbit/sec data rate capability with high voltage output can be used for driving a lithium-niobate or other type of modulator, which modulates or encodes the laser output to obtain the desired optical write waveform. Lithium-niobate modulators are commercially available devices which can turn a continuous laser output of 20 mW into a square wave light output with 10 ps response times and 40 Gbit/sec data rate capability. By using the 80 ps response time of LT GaAs with a 20 mW laser, a 100 mA current can be modulated at frequencies approaching 5 GHz, which corresponds to a data rate of 10 Gbit/sec. In this example, the data rate of 10 Gbit/sec is limited by the 80 ps risetime. By turning a continuous laser output of 40 mW into a square wave light output with a 50 ps response time, a 100 mA current can be modulated at frequencies approaching 7 GHz, which corresponds to a data rate of 14 Gbits/sec. This corresponds to a significant increase in the data rate capability of a recording head. It is anticipated that the properties of the LT-GaAs, the switch electrode design, and the laser power could be optimized to obtain even higher currents out of the photoconductive switch. By employing a design which maximizes the border between opposing electrodes the constraints on switch geometry, laser power, and perhaps voltage, could be relaxed.

While the invention has been described in terms of several examples, it will be apparent to those skilled in the art that various changes can be made to the disclosed examples, without departing from the scope of the invention as set forth in the following claims.

What is claimed is:

1. A write driver for magnetic recording, comprising:
   at least one photoconductive switch positioned adjacent a magnetic recording head for generating current waveforms;
   DC conductors for supplying a DC voltage to said photoconductive switch;
   means for supplying light to said photoconductive switch; and
   recording head means for writing to a storage medium in response to current waveforms generated by said photoconductive switch.

2. The write driver of claim 1, wherein said photoconductive switch comprises a semiconducting substrate comprising a material selected from the group of silicon, silicon-on-sapphire (SOS), low-temperature-grown GaAs, semi-insulating GaAs, SiGe, and $SiO_2/Si_3N_4$.

3. The write driver of claim 1, wherein said photoconductive switch switches said DC voltage to produce a fast risetime write current when said switch is optically illuminated.

4. The write driver of claim 1, wherein said photoconductive switch comprises a metal-semiconductor-metal configuration.

5. The write driver of claim 1, wherein said DC conductors comprise at least one positive electrode, at least one negative electrode and a ground.

6. The write driver of claim 5, wherein said DC conductors comprise a single voltage electrode and a ground on a suspension.

7. The write driver of claim 1, wherein said photoconductive switch comprises a gap between at least two DC conductors.

8. The write driver of claim 1, wherein said means for supplying light comprise a laser.

9. The write driver of claim 1, wherein said means of supplying light includes at least one optical fiber for directing light from a light source to said photoconductive switch.

10. The write driver of claim 1, wherein said means of supplying light includes at least one mirror or lens for directing light from a light source to said photoconductive switch.

11. The write driver of claim 1, wherein said recording head means are structured and arranged for perpendicular recording to said storage medium.

12. The write driver of claim 1, wherein said recording head means are structured and arranged for longitudinal recording to said storage medium.

13. The write driver of claim 1, wherein said recording head means includes a read device.

14. The write driver of claim 1, wherein said means for writing to a storage medium comprise a recording head having at least one recording head conductor structured and arranged to receive current waveforms from said photoconductive switch and to communicate said current waveforms to a write pole structured and arranged for magnetic recording.

15. The write driver of claim 1, wherein said means for writing to a storage medium comprises a pair of write poles with a connecting yoke therebetween, said pair of write poles structured and arranged to apply a magnetic write field to a magnetic storage medium.

16. The write driver of claim 1, wherein said means for writing to a storage medium comprises a pair of write poles having a connecting yoke therebetween, structured and arranged to apply a magnetic write field to a magnetic storage medium, having two coils of opposite polarity wound around said yoke.

17. The write driver of claim 1, further comprising a slider positioned adjacent said recording head means for positioning said recording head in magnetic communication with said storage medium.

18. The write driver of claim 1, further comprising a suspension, said suspension supporting at least one of said at least one photoconductive switch, said DC conductors for supplying a DC voltage, said means for supplying light, and said recording head means for writing to a storage medium.

19. The write driver of claim 1, further comprising an interconnect for carrying current from said photoconductive switch to said recording head means.

20. The write driver of claim 19, wherein said interconnect is from about 0.1 to about 2 mm in length.

21. The photoconductive optical write driver of claim 1, further comprising a transmission line positioned between said DC conductors having an applied DC voltage and said photoconductive switch, said recording head means for writing to a storage medium including means for discharging a charged section of said transmission line through said photoconductive switch.

22. The write driver of claim 21, wherein said transmission line comprises a coaxial cable.

23. The write driver of claim 1, further comprising a preamp for pulsed field writing.

24. A recording device for use with magnetic storage media, comprising:
   a write driver, comprising:
      at least one photoconductive switch positioned adjacent a magnetic recording head for generating current waveforms;
      DC conductors for supplying a DC voltage to said photoconductive switch;
      means for supplying light to said photoconductive switch; and
      means for writing to a storage medium in response to current waveforms generated by said photoconductive switch.

25. The recording head of claim 24 wherein, said means for supplying light comprise a laser.

26. The recording head of claim 24 wherein, said means for supplying light includes at least one optical fiber for directing light from a light source to said photoconductive switch.

27. The recording head of claim 24 wherein, said means for writing to a storage medium comprise a write pole structured and arranged for perpendicular or longitudinal recording to said storage medium.

28. The recording head of claim 24 wherein, said means for writing to a storage medium comprise a pair of write poles with a connecting yoke therebetween, structured and arranged to apply a magnetic write field to said storage medium.

29. The recording head of claim 24 wherein, said means for writing to a storage medium comprise a pair of write poles having a connecting yoke therebetween, structured and arranged to apply a magnetic write field to said storage medium, and having two coils of opposite polarity wound around said yoke.

30. A magnetic disc drive storage system, comprising:

a housing;

a rotatable magnetic storage medium positioned in said housing, said magnetic storage medium having a plurality of magnetic tracks, each of the tracks having a plurality of magnetic domains; and a movable device mounted in said housing adjacent said magnetic storage medium, said device including a photoconductive optical write driver for magnetic recording, said photoconductive optical write driver comprising:

at least one photoconductive switch positioned adjacent a magnetic device for generating current waveforms;

DC conductors for supplying a DC voltage to said photoconductive switch;

means for supplying light to said photoconductive switch; and means for writing to a storage medium in response to current waveforms generated by said photoconductive switch.

31. The recording head of claim 30 wherein, said means for supplying light comprise a laser.

32. The recording head of claim 30 wherein, said means for supplying light includes at least one optical fiber for directing light from a light source to said photoconductive switch.

33. The recording head of claim 30 wherein, said means for writing to a storage medium comprise a write pole structured and arranged for perpendicular or longitudinal recording to said storage medium.

34. The recording head of claim 30 wherein, said means for writing to a storage medium comprise a pair of write poles with a connecting yoke therebetween, structured and arranged to apply a magnetic write field to said storage medium.

35. The recording head of claim 30 wherein, said means for writing to a storage medium comprise a pair of write poles having a connecting yoke therebetween, structured and arranged to apply a magnetic write field to said storage medium, and having two coils of opposite polarity wound around said yoke.

* * * * *